United States Patent [19]

Lisec

[11] Patent Number: 4,961,816
[45] Date of Patent: Oct. 9, 1990

[54] APPARATUS FOR EMPLACING SPACERS

[76] Inventor: Peter Lisec, Bahnhofstrasse 34, A-3363 Amstetten-Hausmenig (NO), Austria

[21] Appl. No.: 313,880

[22] Filed: Feb. 23, 1989

[30] Foreign Application Priority Data

Mar. 25, 1988 [AT] Austria .................................. 801/88

[51] Int. Cl.⁵ .............................................. B32B 31/18
[52] U.S. Cl. ...................... 156/517; 156/106; 156/107; 156/521; 156/556
[58] Field of Search ...................... 156/106, 107, 304.3, 156/517, 521, 522, 552, 556

[56] References Cited

U.S. PATENT DOCUMENTS 2,642,116  6/1953  Fisher et al. .................. 156/520
4,735,674  4/1988  Pace ............................. 156/517

Primary Examiner—Caleb Weston
Attorney, Agent, or Firm—Young & Thompson

[57] ABSTRACT

For the emplacement of spacer shims (21) on glass panes, especially insulating glass panes, an apparatus is disclosed with a storage reel for a strip (2) of cork or the like covered on one side with an adhesive coating, with a drive mechanism for the stepwise conveyance of the strip (2) to a cutting unit (20), with a pressure applicator, provided following the cutting unit (20) for spacer shims (21) cut to size from the strip (2). The suction cup (40) of the pressure-applying means can be advanced toward the surface (44) of a glass pane facing this suction cup and is furthermore freely movable in parallel to the conveying direction (45) of a glass pane to which spacer shims (21) are to be applied. Thus, spacer shims (21) can be attached to glass panes even during movement of the latter.

10 Claims, 2 Drawing Sheets

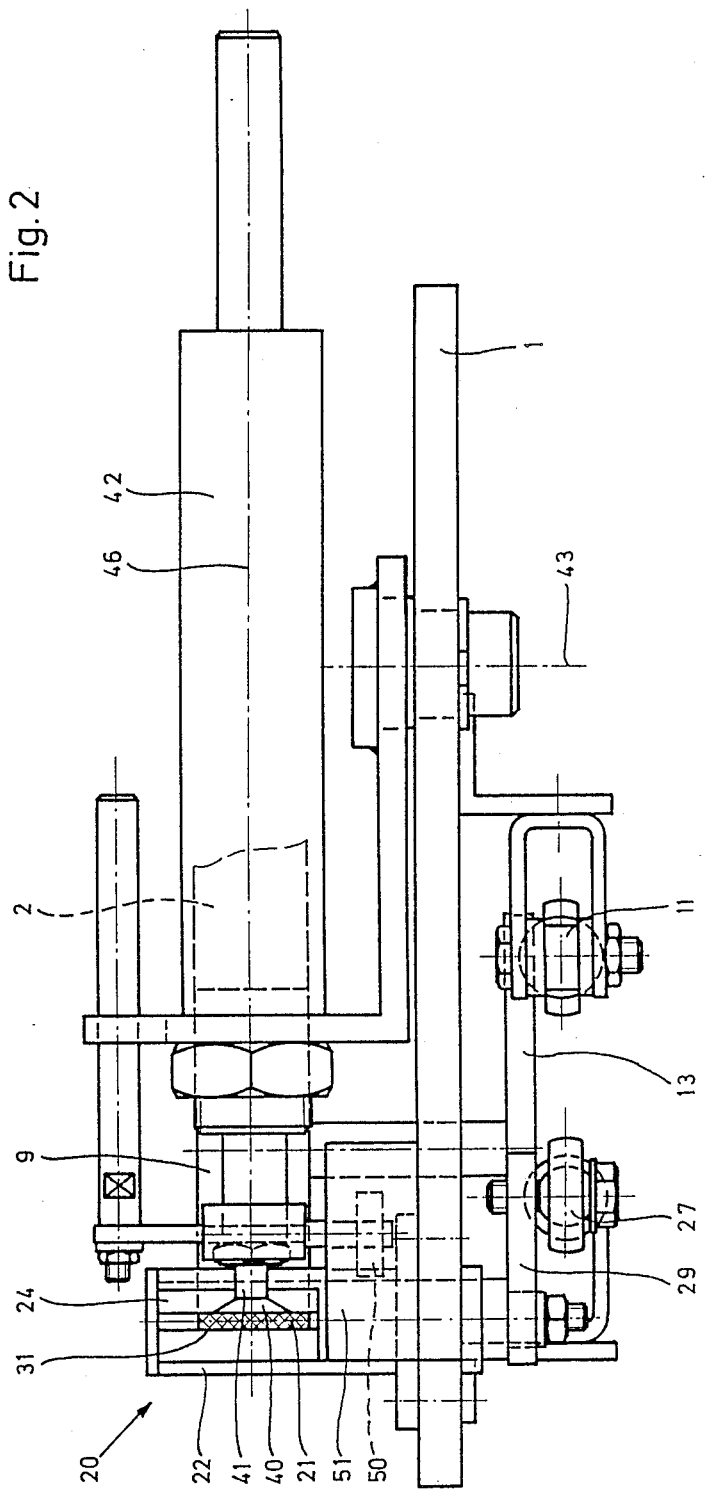

APPARATUS FOR EMPLACING SPACERS

The invention relates to an apparatus for emplacing spacer shims on glass panes, especially on insulating glass panes.

Insulating glass panes are deposited, after their manufacture, on trestles, the procedure being such that initially insulating glass panes having relatively large dimensions are deposited, and in front of these, insulating glass panes are set down having increasingly smaller dimensions. In order to prevent direct contact between the glass panes of the insulating glass plates standing side-by-side and leaning against one another, cork shims provided with an adhesive coating, normally square cork shims, are glued in place manually on the rearward glass panes of the insulating glass plates. These cork shims must be attached to the rear side of the glass panes of the insulating glass plates, i.e. on the sides facing the lateral supporting walls (roller walls, air cushion walls, and the like) in devices for the manufacture of insulating glass panes, since the forward sides are engaged by lifting mechanisms equipped, for example, with suction cups in order to lift the insulating glass panes off the production line and deposit them on the storage racks.

It has also been suggested to spray a synthetic resin onto the front side of insulating glass panes (e.g. thermoplastics or the like) which is to serve, after cooling down, as the spacer means. This procedure is not on target, for the above-mentioned reasons since it can happen that smaller glass plates come into contact, between the plastic spacer means, with the insulating glass panes located therebehind, and scratch the facing surface of the glass.

The invention is based on the object of providing an apparatus making it possible to perform emplacement of spacer shims without requiring manual activities.

According to the invention, this object has been attained by means of an apparatus for emplacing spacer shims on glass panes, especially glass panes of insulating glass plates, characterized by a storage reel for a strip of cork or the like covered on one side with an adhesive coating, this coating being covered by a protective film; by a drive mechanism for conveying the strip to a cutting unit; by a pressure-applying means provided following the cutting unit for the spacer shims, cut to size from the strip by means of the cutting unit, wherein the pressure-applying means exhibits a suction cup for seizing the spacer shims, arranged in its initial position on the delivery side of the cutting unit, this suction cup being advanceable toward the surface of a glass pane that faces this suction cup and to which a spacer shim is to be attached.

The apparatus of this invention makes it possible to emplace spacer shims consisting, for example, of cork or compressed coarse-ground cork material, mechanically, i.e. without manual aid, after the sealing of the insulating glass panes, this being ordinarily the final working step in the manufacture of insulating glass.

The apparatus according to this invention can be integrated with special advantage into the lateral support (roller array or the like) of a delivery conveyor of an insulating glass production line; in this connection, it is preferred to install several apparatuses of this invention distributed over the lateral support of the delivery conveyor or of the insulating glass sealing facility. Such a delivery conveyor, integrated into an apparatus for sealing insulating glass panes, has been known, for example, from German Patent No. 3,038,425.

Since with the aid of the devices according to this invention spacer shims are emplaced on the glass pane facing the lateral support, i.e. that glass pane of insulating glass plates that is at the rear with respect to the insulating glass line, no difficulties are encountered in depositing the insulating glass plates onto the support racks.

Advantageous embodiments of the invention are set forth in the dependent claims.

One embodiment of the apparatus according to this invention will be described in greater detail below with reference to the appended drawings wherein:

FIG. 2 shows the apparatus of FIG. 1 as seen from the right-hand side.

Figure 1:
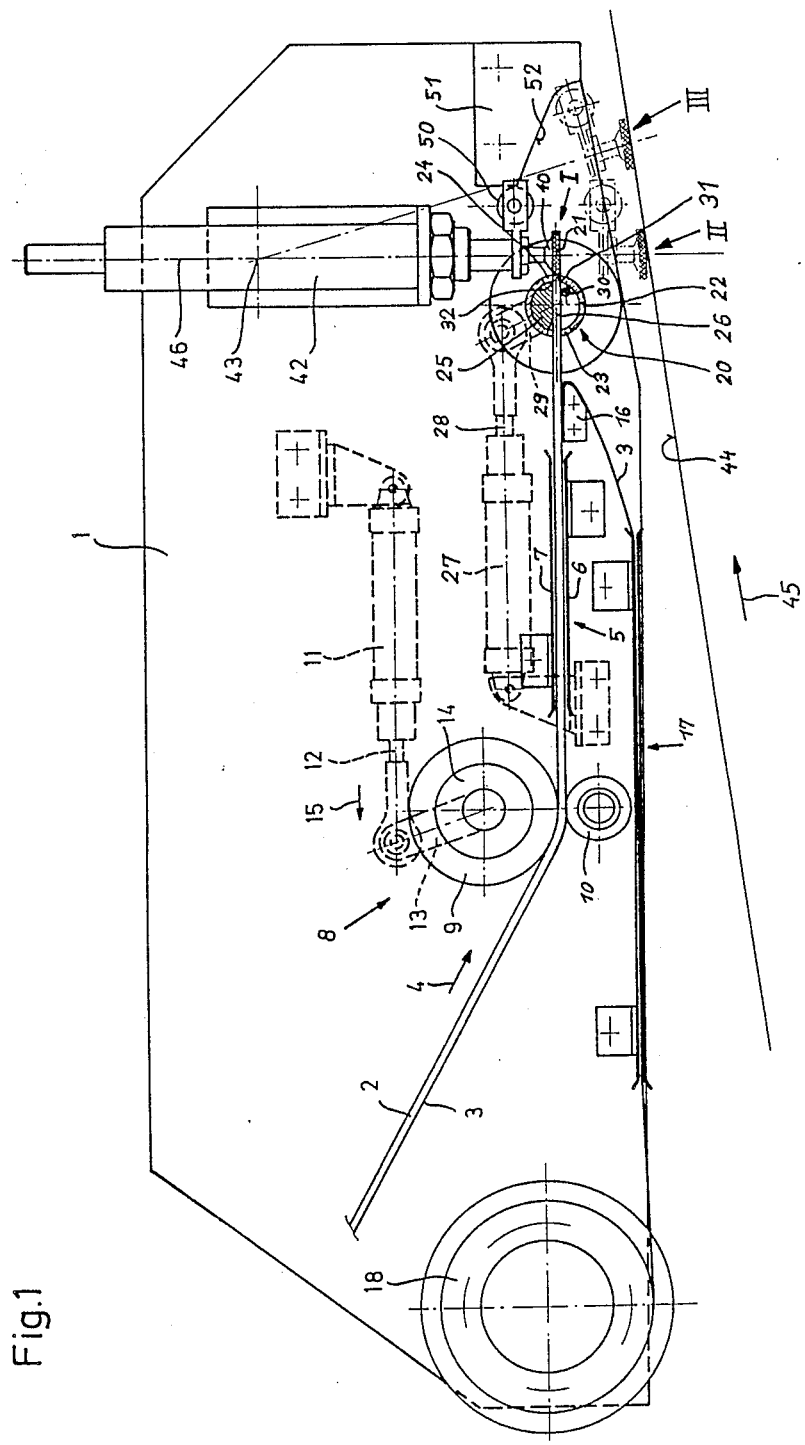
FIG. 1 shows an apparatus for emplacing spacer shims in a top view.

All of the components of the apparatus according to this invention are mounted on a base plate 1 manfactured of sheet metal, for example.

From a storage reel, not shown, a strip 2 of pressed coarse-ground cork, provided unilaterally with an adhesive layer which, in turn, is covered by a protective film 3, is fed in the direction of arrow 4 to a guide channel 5 consisting of two sheet-metal strips 6 and 7. The drive mechanism 8 for the stepwise advance of the strip 2 consists of a friction roller 9 engaging the strip 2, a contact roller 10 being located in opposition to this friction roller. The rollers 9 and 10 are supported on the base plate 1. A pressure medium cylinder 11 is provided for driving the friction roller 9; the piston 12 of this cylinder is articulated to a lever arm 13. The lever arm 13 is coupled with the shaft of the friction roller 9 via a freewheeling mechanism 14 so that the friction roller 9 is rotated only upon a stroke of the piston rod 12 in the direction of arrow 15 along the lines of a further transport of the strip 2 in the direction of arrow 4 whereas a backward stroke of the piston rod 12 does not result in a rotation of the friction roller 9.

A guide means 16 is provided at the delivery end of the guide channel 5, by way of which the protective film 3, after having been pulled off the strip 2, is conveyed through a further guide channel 17 to a windup roller 18. The windup roller 18 is associated with a further rotary drive mechanism, not illustrated, for winding up of the protective film 3.

Based on the conveying direction 4, a cutting unit 20 is provided after the rerouting means 16; this cutting unit cuts spacer shims 21 to size off the strip 2. The cutting unit 20 consists of a hollow cylinder 22 aligned perpendicularly to the base plate 1 and being attached to the latter; this cylinder has an inlet opening 23 and an outlet opening 24 for the strip 2. Within the hollow cylinder 22, a cutting blade 25 having a partially cylindrical shape is housed to be rotatable about an axis 26 perpendicular to the base plate 1. A pressure medium motor 27 is provided for activating the cutting blade 25, the piston rod 28 of this motor being connected to a lever arm 29 supported to be swingable about the axis 26. In the interior of the hollow cylinder 22, in the proximity of its wall, a roller 30 is arranged, the strip 2 being passed through between the face of the cutting blade 25, facing the axis 26, and the roller 30. The roller 30 is mounted just as the cutting blade 25 on the lever arm 29, the latter serving as the holder for the aforementioned components. By operating the cylinder 27, a spacer shim 21 is cut to size in each case off the strip 2 between the edge 31 of the opening 24 of the hollow cylinder 22 and the cutting edge 32 of the cutting blade 25.

A suction cup 40 is provided beside the outlet opening 24 of the hollow cylinder 22, this suction cup being supported by the piston rod 41 of a pressure medium cylinder 42. The piston rod 41 of the pressure medium cylinder 42 is designed to be hollow so that the suction cup 40 can be exposed to a vacuum.

The pressure medium cylinder 42 is supported on the base plate 1 to be freely pivotable about an axis 43 oriented perpendicularly to the base plate 1.

By activating the pressure medium cylinder 42, the suction cup 40 carrying a spacer shim 21 cut to size off the strip 2 is moved toward the side of a glass pane of an insulating glass plate facing the apparatus and urges the spacer shim 21 into contact therewith so that it is glued thereto.

In order to prevent any influence on the cycle time of the insulating glass production line during emplacement of the spacer shims 21, attachment of the spacer shims 21 to the side 44 of the glass pane of the insulating glass plate facing the apparatus takes place while this insulating glass plate moves in the direction of arrow 45. This is readily possible inasmuch as the pressure medium cylinder 42 is freely pivotable about the axis 43 and thus the suction cup 40 can follow the movement of the insulating glass plate (arrow 45) during the emplacement step. These movements are illustrated in FIG. 1 by the indicated motion positions I, II and III of the suction cup 40. In order to permit flat attachment of the spacer shim 21 to the face 44 of the insulating glass pane, the suction cup 40 is movable with respect to the axis 46 of the piston rod 41.

As soon as the suction cup 40 has reached position III in FIG. 1 and the spacer shim 21 has been emplaced, the vacuum is lifted at the suction cup 40 and the latter is retracted by opposite activation of the pressure medium cylinder 42.

In order to move the suction cup 40 back again into position I, a guide roller 50 is mounted to the piston rod 41 in the proximity of the suction cup 40; this guide roller is freely rotatable about an axis perpendicular to the base plate 1. The guide roller 50 is associated with a guide means 51 with a guide face 52, mounted to the base plate 1; this guide means, during traveling of the guide roller 50 along the guide face 52, causes the suction cup 40 to be returned, starting with position III, again into position I.

In this way, spacer shims 21 can be attached, without arresting an insulating glass pane, to the rear face of the latter.

Since ordinarily at least four spacer shims are to be attached to insulating glass panes, at least two apparatuses of the aforedescribed type are provided in superposition in the delivery zone of an insulating glass production line. However, it is readily possible, and preferred, to integrate more than two of such apparatuses in superposition into the delivery zone of the insulating glass production line; these apparatuses are operated in dependence on the size (height) of the insulating glass plane. In this connection, the procedure is such that the apparatuses emplace two spacer shims 21 in the region of the upper and lower corners at the front rim (based on the conveying direction, arrow 45) and that then two further spacer shims 21 are emplaced in the zone of the rearward rim.

The apparatus of this invention can be integrated, instead of comprising a horizontally aligned base plate 1, also into the lateral support of a component of an insulating glass production line, with a substantially vertically oriented base plate.

In an embodiment of the apparatus of this invention, not illustrated, the suction cup 40 for emplacing spacer shims 21 can be exposed for a short time to compressed air in order to emplace the spacer shims 21 under the effect of compressed air to the facing glass pane of an insulating glass plate. This step enhances the emplacement of spacer shims 21. In this embodiment, the suction cup 40 need not be moved up to the facing glass pane of an insulating glass plate and need not be movable therewith (travel from position II to position III).

What is claimed is:

1. In apparatus for emplacing spacer shims (21) on glass panes, comprising a storage reel for a strip (2) of spacing material covered on one side with an adhesive coating, this coating being covered by a protective film (3); a drive mechanism for conveying the strip (2) to a cutting unit (20); a pressure-applying means provided following the cutting unit (20) for the spacer shims (21), cut to size from the strip (2) by means of the cutting unit (20), the pressure-applying means (40, 41) comprising a suction cup (40) for seizing the spacer shims (21), arranged in an initial position (I) on a delivery side of the cutting unit (20), and means to advance said suction cup toward a surface (44) of a glass pane that faces said suction cup and to which a spacer shim (21) is to be attached; the improvement wherein the last-named means comprises a piston rod (41) of a pressure medium cylinder (42) pivotably (axis 43) mounted on the apparatus and oriented perpendicularly to said surface.

2. Apparatus according to claim 1, and a guide roller (50) at the end of the piston rod (41) facing the glass pane, beside the suction cup (40), this roller being associated with a guide surface (52) located on a base plate (1) of the apparatus, the guide roller (50) sliding along this guide surface (52) during a return stroke of the pressure medium cylinder (42) so that the suction cup (40) is again moved back into said initial position (I) wherein it is located beside the cutting unit (20).

3. In apparatus for emplacing spacer shims (21) on glass panes, comprising a storage reel for a strip (2) of spacing material covered on one side with an adhesive coating, this coating being covered by a protective film (3); a drive mechanism for conveying the strip (2) to a cutting unit (20); a pressure-applying means provided following the cutting unit (20) for the spacer shims (21), cut to size from the strip (2) by means of the cutting unit (20), the pressure-applying means (40, 41) comprising a suction cup (40) for seizing the spacer shims (21), arranged in an initial position (I) on a delivery side of the cutting unit (20), and means to advance said suction cup toward a surface (44) of a glass pane that faces said suction cup and to which a spacer shim (21) is to be attached; the improvement wherein the cutting unit (20) includes a hollow cylinder (22) comprising two openings (23 and 24) in substantially diametrical mutual opposition for the entrance and, respectively, exit of the strip (2), and a partly cylindrical cutting blade (25) in the interior of the hollow cylinder (22) and rotatable relative to the cylinder.

4. Apparatus according to claim 3, wherein the strip (2) passes through and within the hollow cylinder (22) of the cutting unit (20) between a face of the cutting blade (25), facing the axis (26) of the hollow cylinder (22), and a roller (30) arranged adjacent a wall of the hollow cylinder (22).

5. Apparatus according to claim 4, wherein the cutting blade (25) and the roller (30) are mounted within the hollow cylinder (22) to be pivotable about the axis (26) of the latter.

6. Apparatus according to claim 3, further comprising a guide channel (5) for the strip (2) upstream of the hollow cylinder (22) of the cutting unit (20), and a drive mechanism (8) for stepwise advancement of the strip (2) on an inlet side of the guide channel (5).

7. Apparatus according to claim 6, wherein a stroke of the drive mechanism (8) corresponds to the width of a spacer shim (21).

8. Apparatus according to claim 6, wherein the drive mechanism (8) for the strip (2) is a friction roller (9) coupled with a pressure medium motor (11) by way of a lever arm (13), and the lever arm (13) is coupled with the friction roller (9) solely in the direction of advancement (arrow 4) for entrainment action.

9. Apparatus according to claim 8, further comprising a freely rotatable pressure roller (10) arranged in opposition to the friction roller (9), the strip (2) passing between the two rollers (9, 10).

10. Apparatus according to claim 6, wherein, following the guide channel (5), the protective film (3) is pulled off the strip (2) and is wound up onto a reel (18).

* * * * *